(12) United States Patent
Wang

(10) Patent No.: US 9,356,266 B2
(45) Date of Patent: May 31, 2016

(54) BATTERY PACK

(71) Applicant: SAMSUNG SDI CO., LTD., Yongin-si, Gyeonggi-do (KR)

(72) Inventor: Han-Jun Wang, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 121 days.

(21) Appl. No.: 14/025,757

(22) Filed: Sep. 12, 2013

(65) Prior Publication Data

US 2014/0178716 A1    Jun. 26, 2014

Related U.S. Application Data

(60) Provisional application No. 61/745,301, filed on Dec. 21, 2012.

(51) Int. Cl.
*H01M 2/10* (2006.01)

(52) U.S. Cl.
CPC .......... *H01M 2/1022* (2013.01); *H01M 2/1061* (2013.01); *H01M 2/1072* (2013.01); *H01M 2/1077* (2013.01)

(58) Field of Classification Search
CPC ... H01M 2/10; H01M 2/1067; H01M 2/1072; H01M 2/1022; H01M 2/1077
USPC ................... 429/100, 151, 159, 163, 175, 176
See application file for complete search history.

(56) References Cited

U.S. PATENT DOCUMENTS

| | | | |
|---|---|---|---|
| 6,498,457 B1 | 12/2002 | Tsuboi | |
| 6,517,967 B1 | 2/2003 | Shrim et al. | |
| 6,689,511 B2 * | 2/2004 | Yamada et al. | 429/175 |
| D708,128 S * | 7/2014 | Andre et al. | D13/103 |
| 2005/0164080 A1 | 7/2005 | Kozu et al. | |
| 2008/0318119 A1 * | 12/2008 | Watanabe et al. | 429/99 |
| 2012/0156539 A1 * | 6/2012 | Honjo et al. | 429/100 |
| 2014/0004407 A1 * | 1/2014 | Keates | 429/158 |

FOREIGN PATENT DOCUMENTS

| | | |
|---|---|---|
| EP | 2 475 024 A2 | 7/2012 |
| JP | 2000-149895 A | 5/2000 |
| JP | 2010-244822 A | 10/2010 |
| KR | 10-2004-0085478 A | 10/2004 |
| KR | 10-2012-0052035 A | 5/2012 |
| KR | 10-2012-0054807 A | 5/2012 |
| WO | WO 2011078536 A2 * | 6/2011 |

OTHER PUBLICATIONS

Patent Abstracts of Japan and Machine English Translation of JP 2010-244822 A, Oct. 28, 2010, 19 Pages.
Extended European Search Report dated Apr. 16, 2014 for EP 13173105.1, 6 pgs.
Patent Abstracts of Japan and English Machine Translation of JP 2000-149895 A, 11 pages.

* cited by examiner

*Primary Examiner* — Gregg Cantelmo
(74) *Attorney, Agent, or Firm* — Lewis Roca Rothgerber Christie LLP

(57) ABSTRACT

A battery pack includes a battery cell; a case comprising a first case and a second case coupled together and accommodating the battery cell, wherein the first case includes a first rib extending circumferentially around the first case and generally defining a battery cell accommodation space for the battery cell around an interior of the first rib, the first rib having a ridged section comprising alternating thick portions and thin portions.

19 Claims, 10 Drawing Sheets

BATTERY PACK

CROSS-REFERENCE TO RELATED APPLICATION

This application claims priority to and the benefit of U.S. Provisional Application No. 61/745,301, filed on Dec. 21, 2012 in the U.S. Patent and Trademark Office, the entire content of which is incorporated herein by reference.

FIELD

One or more embodiments of the present invention relate to battery packs.

DESCRIPTION OF THE RELATED ART

Generally, unlike primary batteries that cannot be recharged, secondary batteries are batteries that can be charged, discharged, and recharged. Secondary batteries are used as power sources for mobile devices, electric cars, hybrid cars, electric bicycles, uninterruptible power supplies, etc. According to the type of external device to which a secondary battery is to be applied, the secondary battery may be used in the form of a single battery cell or a battery pack in which a plurality of battery cells are connected.

Although a small mobile device, such as a mobile phone, may operate for a period of time with the output and capacity of a single battery cell, a battery pack may be desired for a mobile device that consumes a relatively large amount of power, e.g., a laptop, or a device requiring long operation and high power, e.g., an electric car, a hybrid car, etc., where output voltage or output current of a battery pack may increase as a number of battery cells included therein increases.

SUMMARY

One or more embodiments of the present invention include a battery pack with reduced deformation due to cooling contraction after high-temperature molding of a battery case and reduced noises during assembly of the battery case.

According to one or more embodiments of the present invention, a battery pack includes a battery cell; a first case and a second case which are attached to face each other to provide a space for accommodating the battery cell, wherein the first case includes a first rib to surround the battery cell, and the first rib includes an uneven portion in which thick portions and thin portions having different thicknesses are alternately arranged.

For example, the first case includes a first base plate arranged to face a first main surface of the battery cell, and the first rib protrudes along an edge of the first base plate.

For example, the first base plate includes a flange unit to be attached to a main device.

For example, the uneven portion is formed at a portion of the first rib forming the boundary against the flange unit.

For example, the flange unit is formed at a corner of the first base plate.

For example, the uneven portion is formed along the first rib bent to surround the flange unit.

For example, the uneven portion is formed at a corner of the first rib splitting into different directions to surround the flange unit.

For example, the flange unit includes a first flange unit and a second flange unit that are formed at two opposite corners in a direction along a side of the first base plate.

For example, a strength reinforcement unit is formed at the flange unit.

For example, a boss protruding toward the main device is formed at the flange unit to be attached to the main device.

For example, the uneven portions are intermittently formed in the lengthwise direction of the first rib.

For example, a flat portion is formed between the uneven portions adjacent to each other.

For example, the flat portion is formed to have a substantially uniform thickness.

For example, a connecting unit for interconnecting the first case and the second case is formed at the flat portion.

For example, the connecting units are intermittently formed through the entire length of the first rib.

For example, the second case includes a second base plate arranged to face a second main surface of the battery cell, and a second rib protruding along an edge of the second base plate.

For example, the plurality of battery cells are arranged, the battery cells adjacent to each other are stacked to form different layers, and the second main surfaces of the battery cells adjacent to each other form a stepped portion.

For example, the second base plate has a stepped portion having a shape corresponding to the stepped portion between the second main surfaces of the battery cells adjacent to each other.

First and second connecting units for mutually attaching the first and second cases are formed at the first and second ribs, respectively.

For example, the first and second connecting units form hooked connection.

For example, the first connecting unit includes a connecting plate, which is formed at a location offset from the first rib and includes a connecting opening, and the second connecting unit includes a hook that is inserted into and locked by the connecting opening.

For example, the first and second connecting units are formed at mutually corresponding locations, and the flange unit of the first base plate is formed at a location offset from the second base plate.

For example, the accommodation space includes a cell accommodating space for accommodating the battery cell and a circuit accommodating space for accommodating a protection circuit module for controlling operations for charging and discharging the battery cell.

First and second flange units to be combined with a main device may be formed at two opposite sides of the circuit accommodating space.

According to the present invention, there is provided a battery pack without a deformation due to cooling contraction after high-temperature molding of a battery case and without noises during assembly of the battery case.

DETAILED DESCRIPTION

Figure 1:
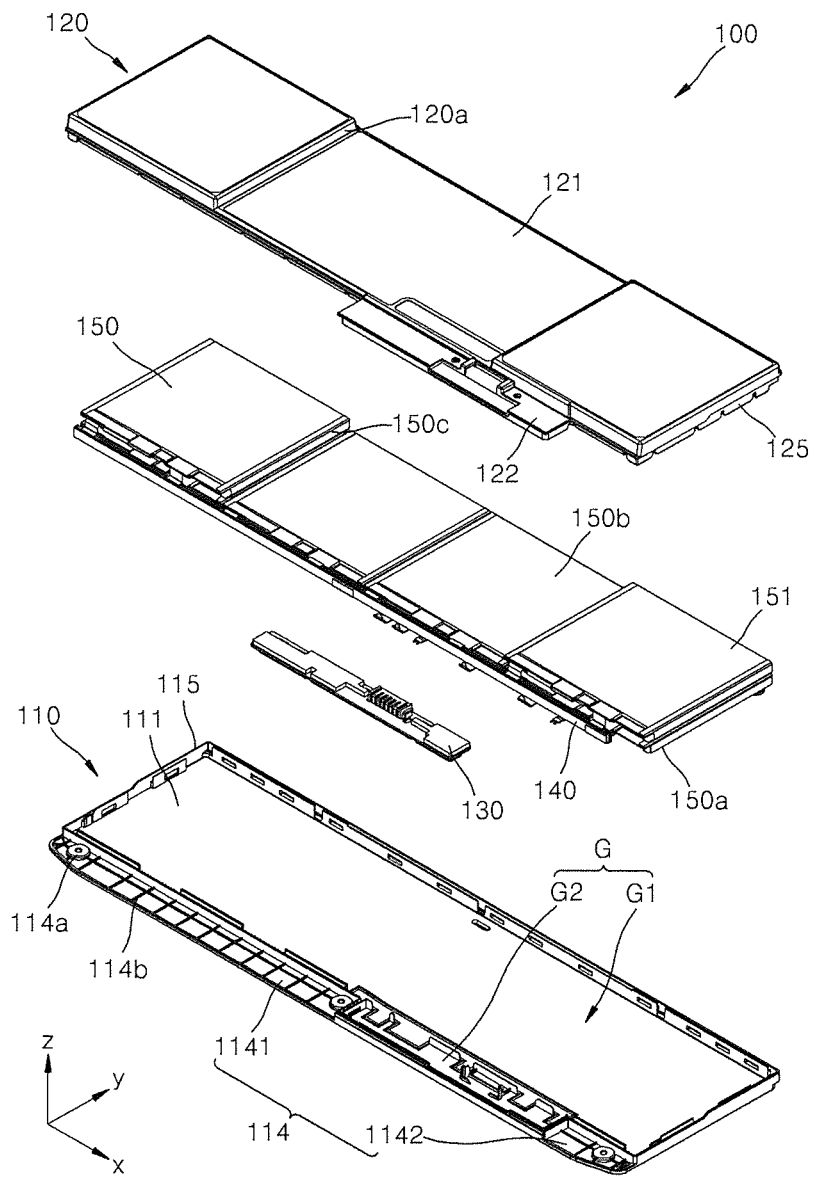
FIG. 1 is an exploded perspective view of a battery pack according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Hereinafter, a battery pack according to an exemplary embodiment of the present invention will be described with reference to the attached drawings.

Figure 2:
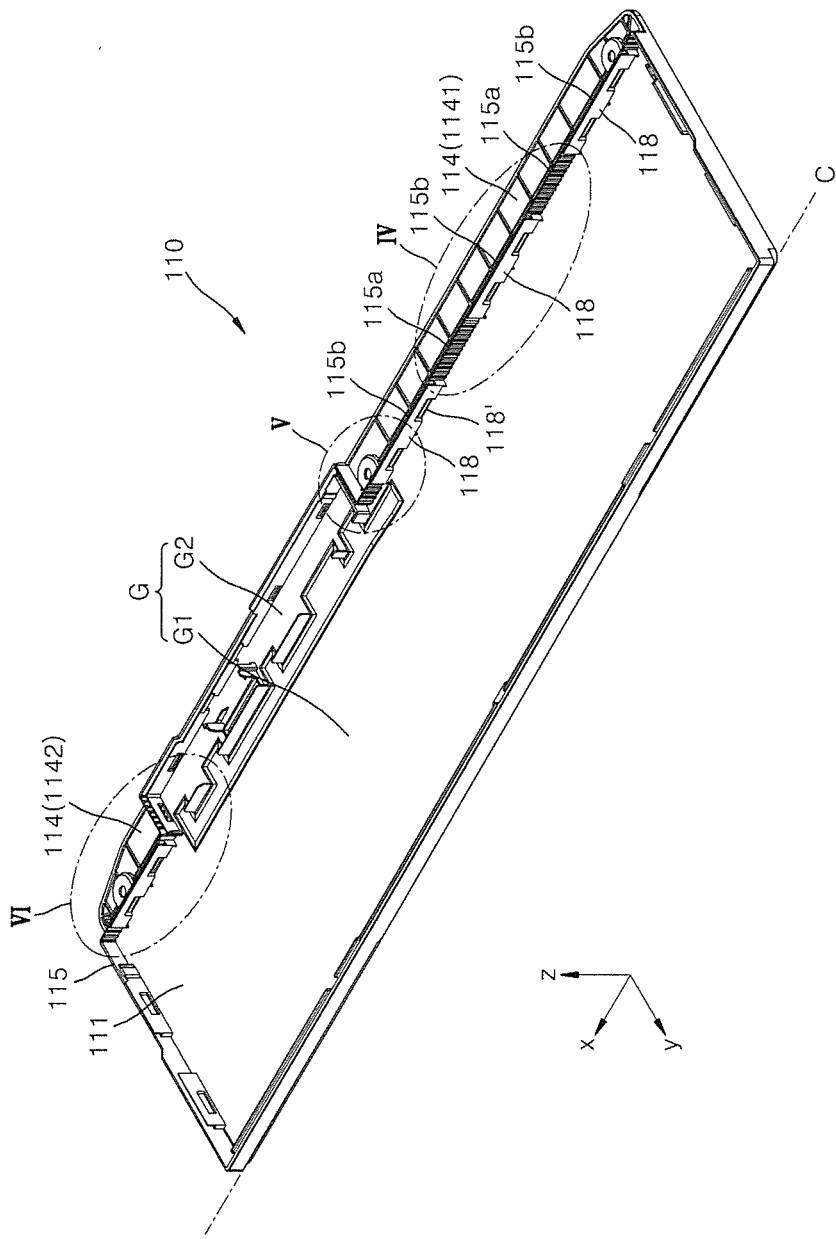
FIGS. 2 and 3 are exploded perspective views of a first case and a second case shown in FIG. 1, respectively.
Figure 3:
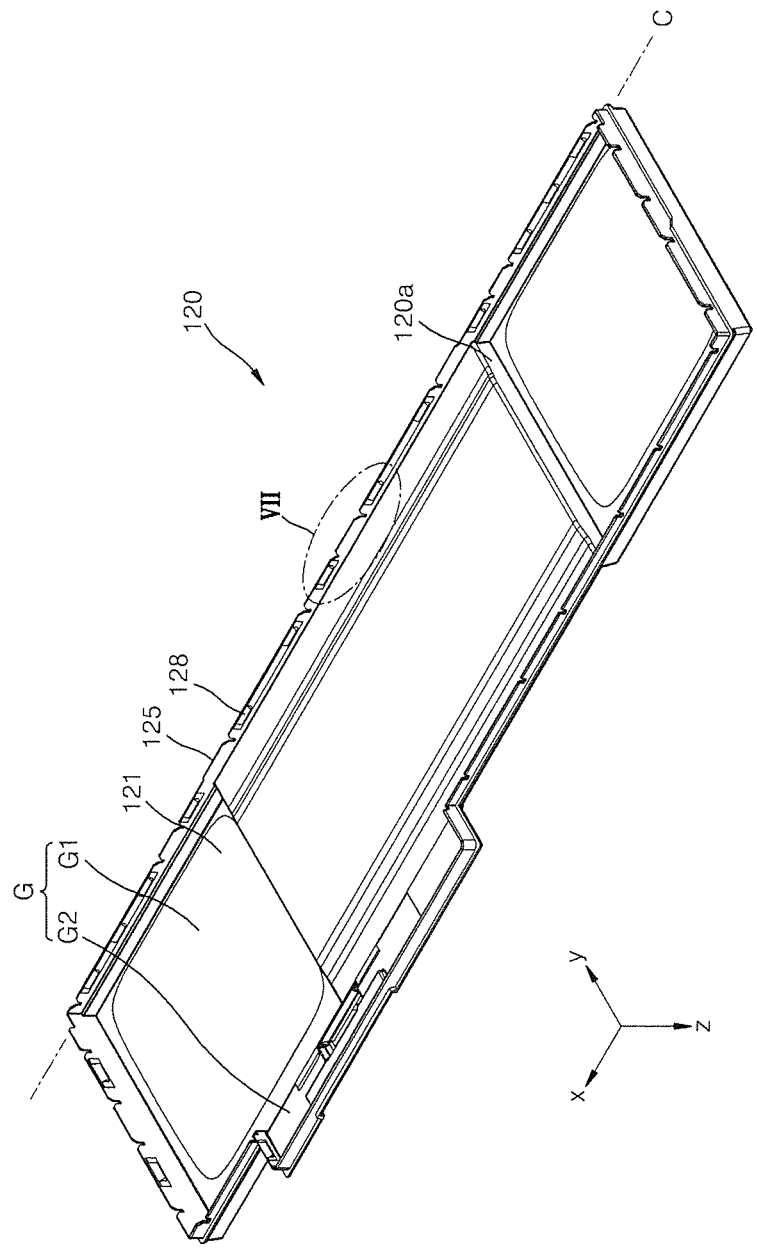

FIG. 1 is an exploded perspective view of a battery pack 100 according to an embodiment of the present invention. FIGS. 2 and 3 are exploded perspective views of a first case 110 and a second case 120 shown in FIG. 1, respectively. In one embodiment, as shown in FIGS. 2 and 3, the first case 110 and the second case 120 may be assembled to rotate around the assembly axis C and face each other.

Referring to FIGS. 1 through 3, the battery pack 100 includes at least one battery cell 150 and the first case 110 and the second case 120 that are assembled to face each other to provide an accommodation space G of the battery cell 150.

The first case 110 and the second case 120 are assembled by inserting the at least one battery cell 150 therebetween in the accommodation space G of the battery cell 150. For example, the first case 110 may include a first base plate 111 and a first rib 115 which protrudes from the first base plate 111 and defines the accommodation space G. Similarly, the second case 120 may include a second base plate 121 and a second rib 125, which protrudes from the second base plate 121 and defines the accommodation space G.

The first base plate 111 and the second base plate 121 may be formed as overall-flat plates and may be arranged to face each other across the battery cells 150. Generally, the first base plate 111 and the second base plate 121 may have mutually corresponding shapes and each of the first base plate 111 and the second base plate 121 may have a substantially rectangular shape including a pair of long sides extending in a long-side direction (x-axis direction) and a pair of short sides extending in a short-side direction (y-axis direction).

According to an embodiment of the present invention, the first base plate 111 and the second base plate 121 may be formed to have different shapes. In other words, the first base plate 111 may be formed to have a rectangular shape, whereas the second base plate 121 may have a shape not facing a flange unit 114 of the first base plate 111. As described below, since the flange unit 114 interconnects the battery pack 100 and a main device, the second base plate 121 and the flange unit 114 may be formed at mutually exclusive locations to prevent the second base plate 121 from being located between the flange unit 114 and the main device.

In other words, the flange unit 114 of the first base plate 111 may be formed at a location spaced from the second base plate 121. For example, the flange unit 114 may be formed at two opposite corners of the first base plate 111 along the long-side direction (x-axis direction), and the second base plate 121 may have a shape inwardly receding to avoid the flange unit 114 at the corners, that is, a shape in which the center portion of the long-side (in x-axis direction) protrudes. The protruding portion of the second base plate 121 may form a circuit accommodating unit 122 for forming a circuit accommodating space G2 together with the first base plate 111.

In one embodiment, the first base plate 111 may constitute a portion of the overall outer appearance of a main device by being assembled to the main device, where a rubber pad for supporting the entire main device may be formed on the bottom surface of the first base plate 111.

The first rib 115 and the second rib 125 may protrude from edges of the first base plate 111 and the second base plate 121, respectively. The first rib 115 and the second rib 125 may be formed at mutually corresponding locations to surround the battery cells 150 and to define the accommodation space G. For example, the first rib 115 and the second rib 125 may be arranged to form a closed-loop to seal the accommodation space G.

The first rib 115 is formed substantially along an edge of the first base plate 111, where the first rib 115 may be formed around the flange unit 114 and inside of the flange unit 114. In other words, since the flange unit 114 is arranged to directly face a main device and interconnects the battery pack 100 and the main device, the accommodation space G of the battery pack 100 may be formed at a location by which connection of the flange unit 114 to the main device is not interfered. In other words, the accommodation space G of the battery pack 100 and the flange unit 114 may be formed at mutually exclusive locations. In one embodiment, the second rib 125 may be formed along an edge of the second base plate 121.

Referring to FIGS. 2 and 3, first and second connecting units 118 and 128 interconnecting the first case 110 and the second case 120 may be formed at the first rib 115 and the second rib 125, respectively. For example, when the first case 110 and the second case 120 are attached to face each other, the first rib 115 and the second rib 125 may be assembled to contact each other and may be attached to each other via the first and second connecting units 118 and 128 formed at mutually corresponding locations.

Figure 4:
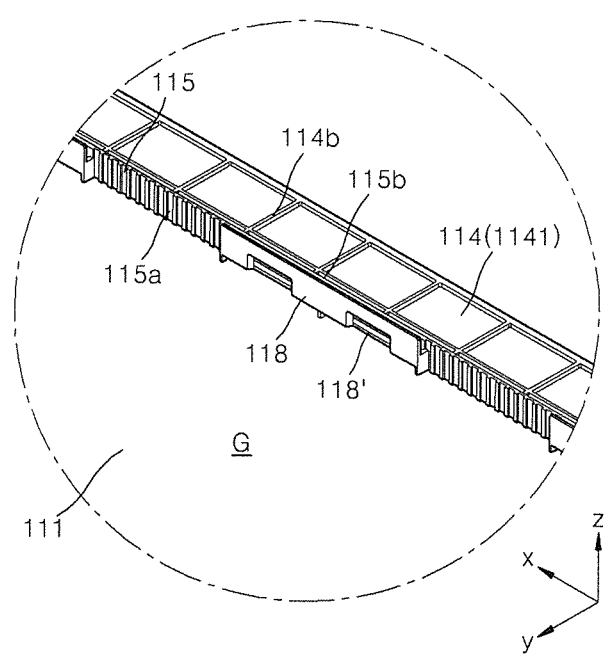
FIGS. 4 through 6 are perspective views of the sections IV, V, and IV of FIG. 2 in closer details, respectively.
Figure 5:
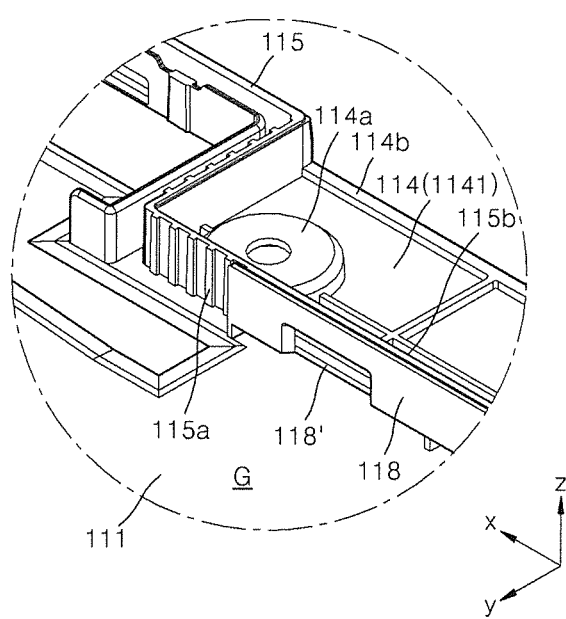
Figure 6:
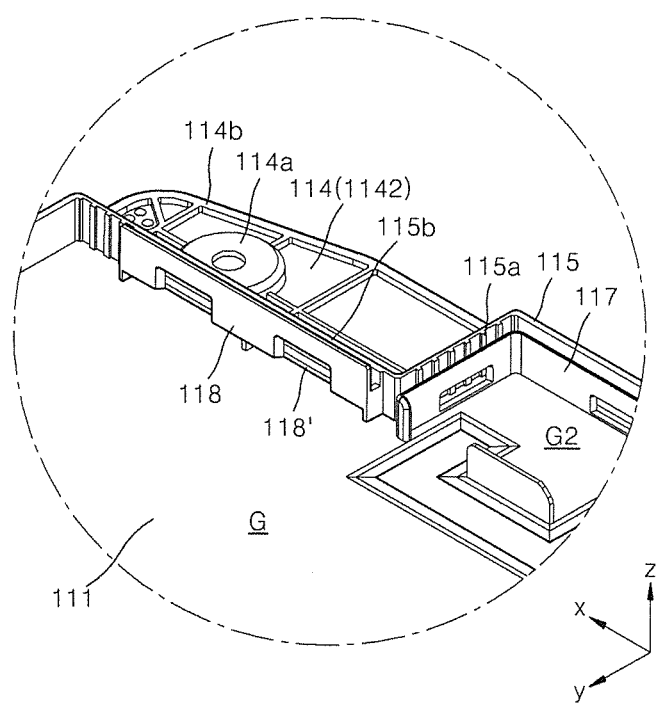
Figure 7:
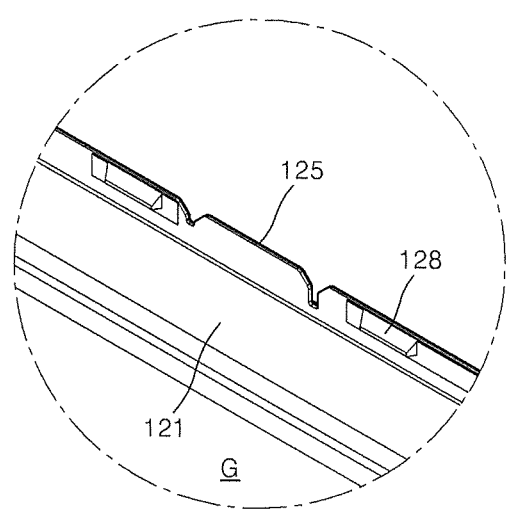
FIG. 7 is a perspective view of the section VII of FIG. 3 in closer detail.

FIGS. 4 through 6 are perspective views of the sections IV, V, and IV of FIG. 2 in closer details, respectively. FIG. 7 is a perspective view of the section VII of FIG. 3 in closer detail.

Referring to FIGS. 4 through 7, the first and second connecting units 118 and 128 may be formed at the first rib 115 and the second rib 125 to interconnect the first case 110 and the second case 120. For example, the first and second connecting units 118 and 128 may form a hooked connection. As described below, the first connecting unit 118 is arranged at a location offset from the first rib 115 and may include a connecting plate in which a connecting opening 118' is formed. Furthermore, the second connecting unit 128 may include a hook that is inserted into the connecting opening 118' and locked thereby. As the hook (the second connecting unit 128) formed at the second rib 125 is stopped and locked by the connecting opening 118' formed at the first rib 115, the first and second connecting units 118 and 128 may be prevented from being detached from each other.

Hereinafter, referring to FIGS. 2 and 4 through 6, an uneven portion 115a of the first rib 115 will be described.

Referring to FIGS. 2 and 4 through 6, the uneven portion 115a may be formed at the first rib 115. For example, the uneven portion 115a may be formed on the inner surface of the first rib 115 facing the accommodation space G.

The uneven portion 115a may contribute to prevention of contraction. For example, the first case 110 and the second case 120 may be formed to have appropriate shapes via high-temperature molding. Here, the uneven portion 115a may contribute to prevention of cooling contraction.

As described below, the uneven portion 115a includes an uneven pattern in which thick portions and thin portions are alternately and repeatedly arranged to form alternating ridges and grooves, thereby preventing contraction of the first rib 115 and maintaining a thickness sufficient for stably supporting the second rib 125 assembled on the first rib 115.

The uneven portion 115*a* may be formed entirely along the length of the first rib 115 or may be selectively formed along a portion of the first rib 115. In detail, according to an embodiment of the present invention, the uneven portion 115*a* may be selectively formed along a portion of the first rib 115. According to an embodiment of the present invention, the uneven portion 115*a* may be formed at a portion of the first rib 115 that forms the boundary against the flange unit 114. In other words, the uneven portion 115*a* may be formed at a portion of the first rib 115 which separates the flange unit 114 and the accommodation space G from each other.

The flange unit 114 is configured to interconnect the battery pack 100 and a main device, where an assembly unit 114*a* is formed on the flange unit 114. If the first rib 115 forming the boundary against the flange unit 114 is contracted and deformed, the warpage may prevent the flange unit 114 from being easily assembled to a main device.

For example, according to an embodiment of the present invention, a boss may be formed at the flange unit 114 as the assembly unit 114*a* to be assembled to a main device, where an attachment hole for screw attachment may be formed in the assembly unit 114*a*. If warpage is formed at the 114, location or perpendicularity of the boss may be distorted, and thus assembly to a main device may become difficult. Therefore, the uneven portion 115*a* may be selectively formed at a portion of the first rib 115 contacting the flange unit 114.

In one embodiment, according to another embodiment of the present invention, the uneven portion 115*a* may be formed entirely along the length of the first rib 115. In this case, the uneven portion 115*a* may also prevent contraction and deformation of the first rib 115 and reduce assembly noises.

An orientation between the flange unit 114 and the uneven portion 115*a* will be described below in more detail. For example, the flange unit 114 may include a first flange unit 1141 and a second flange unit 1142 along the long-side direction (x-axis direction) of the first base plate 111, where the uneven portion 115*a* may be formed at the first rib 115 surrounding the first flange unit 1141 and the second flange unit 1142.

Referring to FIG. 5, the flange unit 114 may be formed at corners of the first base plate 111, and the uneven portion 115*a* may be formed along the first rib 115 that is bent to surround the flange unit 114. In other words, the uneven portion 115*a* is formed along the first rib 115 that is bent to surround the flange unit 114 and may be formed along the first rib 115 extending in two different directions (x-axis direction and y-axis direction).

The uneven portion 115*a* may be formed at a corner of the first rib 115 splitting into two different directions (x-axis direction and y-axis direction). For example, the uneven portion 115*a* may be selectively formed at intermittent portions in the lengthwise direction of the first rib 115, where the uneven portion 115*a* may be formed at the corner of the first rib 115. Contraction stress may be applied to the corner, which splits into two different directions (x-axis direction and y-axis direction), in the two different directions during cooling contraction after high-temperature molding, and thus contraction stress may be concentrated thereto. For example, according to concentration of contraction stress, more contraction of volume may occur at the corner of the first rib 115 as compared to other portions of the first rib 115. Therefore, the uneven portion 115*a* may be arranged to reduce contraction stress applied to the corner of the first rib 115 and reduce stress transmitted to the flange unit 114 as much as possible.

In FIG. 6, unlike in FIG. 5, the uneven portion 115*a* is not formed at the corner of the first rib 115 splitting into two different directions (x-axis direction and y-axis direction). Instead, the uneven portion 115*a* is formed at a portion of the first rib 115 extending in a direction (y-axis direction), whereas a flat portion 115*b* having a substantially uniform thickness is formed at a portion of the first rib 115 extending in another direction (x-axis direction). As described below, the first connecting unit 118 to be attached to the second case 120 is formed at the flat portion 115*b*, the flat portion 115*b* having a relatively smooth surface is formed to not to interfere the attachment. In one embodiment, the reference numeral 117 in FIG. 6 denotes a clamping member to fix a circuit unit accommodated in the circuit accommodating space G2.

Referring to FIG. 2, the uneven portions 115*a* may be intermittently formed in the lengthwise direction of the first rib 115, and the flat portions 115*b* having a substantially uniform thickness may be formed between the uneven portions 115*a* of the first rib 115.

The first connecting unit 118 may be formed at the flat portion 115*b*. The first and second connecting units 118 and 128 clamp the first case 110 and the second case 120, such that the first case 110 and the second case 120 are not detached from each other. The flat portion 115*b* provides attachment spots for the first and second connecting units 118 and 128. For example, the flat portion 115*b* may have substantially uniform thickness and relatively smooth surfaces to not to interfere the attachment between the first and second connecting units 118 and 128.

The first connecting unit 118 is arranged at a location offset from the flat portion 115*b* and may include a connecting plate in which the connecting opening 118' is formed. For example, the second connecting unit 128 (the hook) may be inserted into the connecting opening 118' between the flat portion 115*b* and the first connecting unit 118 and locked thereby, where entrance friction of the second connecting unit 128 may be reduced by the flat portion 115*b* having a uniform thickness and smooth surfaces. The first connecting unit 118 may extend from a location offset from the flat portion 115*b* in parallel therewith and may be formed as an overall flat plate-like structure.

The first connecting unit 118 may be formed entirely along the length of the first rib 115. In other words, the first connecting unit 118 may be not only formed at the portion that forms the boundary against the flange unit 114, but also formed entirely along the length of the first rib 115 extending to surround the battery cells 150.

The first connecting unit 118 may be intermittently formed in the lengthwise direction of the first rib 115. The first and second connecting units 118 and 128 may be formed at mutually corresponding locations to be attached to each other. To firmly clamp the first case 110 and the second case 120, the first and second connecting units 118 and 128 may be formed entirely along the lengths of the first rib 115 and the second rib 125.

For example, connecting plates (the first connecting unit 118) extending in parallel to the first rib 115 may be arranged at intermittent locations along the length of the first rib 115. Furthermore, the connecting opening 118' by which the second connecting unit 128 (the hook) is locked may be formed in the connecting plate. The second connecting unit 128 may enter between the first rib 115 and the connecting plate and be fixed by the connecting opening 118'.

Referring to FIG. 1, the flange unit 114 may be formed in the long-side direction (x-axis direction) of the first base plate 111. For example, the flange unit 114 may be formed at the two opposite corners in the long-side direction (x-axis direction). For example, the flange unit 114 may include the first flange unit 1141 and the second flange unit 1142 along the long-side direction (x-axis direction) of the first base plate 111. The first flange unit 1141 may extend longer than the second flange unit 1142 from the corner in the long-side direction (x-axis direction).

As described below, the circuit accommodating space G2, in which a protection circuit module 130 for controlling operations for charging and discharging the battery cells 150 is accommodated, may be arranged between the first flange unit 1141 and the second flange unit 1142. By accommodating the protection circuit module 130 in the space between the first flange unit 1141 and the second flange unit 1142, the overall structure of the battery pack 100 may be compact.

The flange unit 114 is to interconnect the battery pack 100 and a main device. The assembly unit 114a, such as a boss, may be formed at the flange unit 114, where a screw attachment hole for screw attachment may be formed in the boss. For example, the assembly unit 114a may protrude upward from the top surface of the flange unit 114 or may be formed in any of various forms to align the battery pack 100 to a main device to which the battery pack 100 is to be attached.

A strength reinforcement unit 114b may be formed at the flange unit 114. The flange unit 114 is to interconnect the battery pack 100 and a main device, and the assembly unit 114a, such as a boss, is formed thereon. Therefore, if contraction and/or deformation occurs at the flange unit 114, it may become difficult to attach the battery pack 100 to the main device. For example, the strength reinforcement unit 114b may be formed as a stripe-pattern rib structure protruding from the top surface of the flange unit 114.

Figure 8:
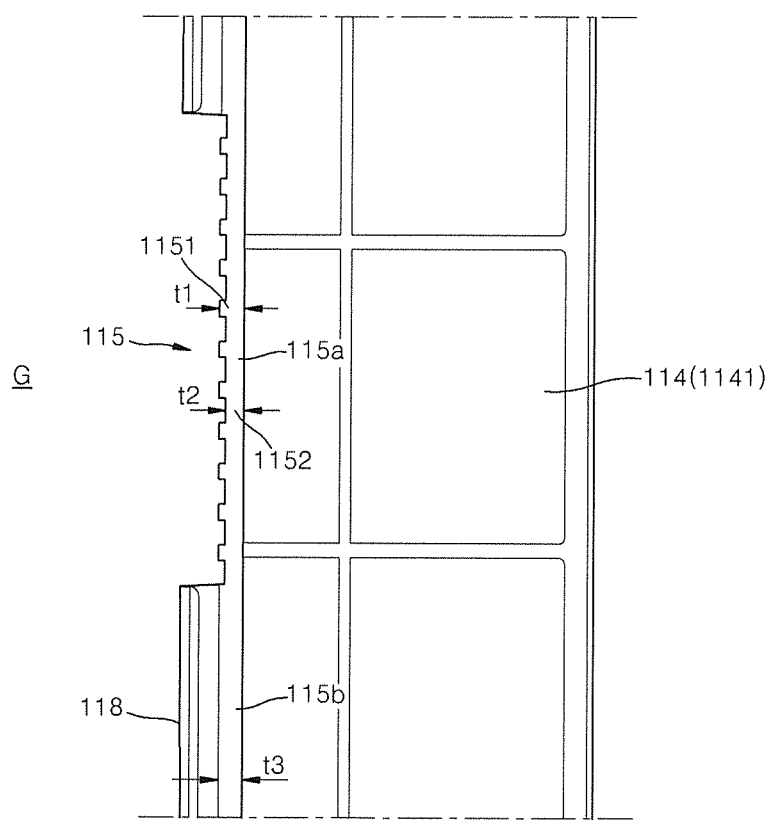
FIG. 8 is a plan view showing an uneven portion of FIG. 4 in closer detail.

FIG. 8 is a plan view showing the uneven portion 115a of FIG. 4 in closer detail. Referring to FIG. 8, the uneven portion 115a may include an uneven pattern in which thick portions 1151 and thin portions 1152 are alternately and repeatedly arranged in the lengthwise direction of the first rib 115. For example, the thick portion 1151 and the thin portion 1152 may be formed to have different thicknesses, that is, a first thickness t1 and a second thickness t2, respectively.

The uneven portion 115a may contribute to prevention of contraction. For example, the first case 110 and the second case 120 may be formed to have appropriate shapes via high-temperature molding. Here, the uneven portion 115a may contribute to prevention of cooling contraction.

The uneven portion 115a includes an uneven pattern in which the thick portions 1151 and the thin portions 1152 are alternately and repeatedly arranged, thereby preventing contraction of the first rib 115 and maintaining a thickness sufficient for stably supporting the second rib 125 assembled on the first rib 115.

The first rib 115 protrudes from the first base plate 111, where the first rib 115 and the first base plate 111 that are adjacent to each other may apply stress to each other based on thickness relationship therebetween during cooling contraction. As described below, if the first rib 115 is thicker than the first base plate 111, the first base plate 111 may be pulled as a volume of the first rib 115 contracts, thereby causing warpage. Therefore, a thickness of the uneven portion 115a, that is, the first thickness t1 and the second thickness t2 of the thick portion 1151 and the thin portion 1152 may be equal to or smaller than the thickness of the first base plate 111.

According to an embodiment of the present invention, the first thickness t1 of the thick portion 1151 and the second thickness t2 of the thin portion 1152 may be from about 0.6 mm to about 0.8 mm. In detail, the first thickness t1 of the thick portion 1151 may be about 0.8 mm, whereas the second thickness t2 of thin portion 1152 may be about 0.6 mm. Here, thickness of the first base plate 111 may be about 0.8 mm.

Figure 9:
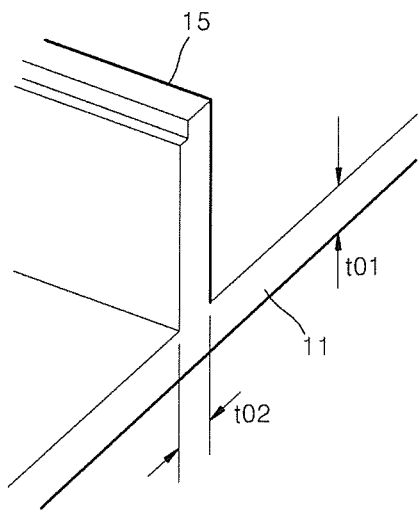
FIGS. 9 through 11B show shapes of first ribs according to first through third comparative embodiments.

FIG. 9 shows the structure of a first rib 15 according to a first comparative embodiment. The first rib 15 protrudes upward from a first base plate 11 and may have a thickness t02 greater than thickness t01 of the first base plate 11. The first rib 15 and the first base plate 11 may experience contraction and deformation as being cooled after high-temperature molding, where the relatively thick first rib 15 receives greater stress than the first base plate 11. The first rib 15 contracts in the thickness direction, thereby pulling the first base plate 11 upward.

The first rib 15 and the first base plate 11 may interfere with each other during contraction and deformation, where the relatively thick first rib 15 undergoes volume contraction, thereby influencing the first base plate 11. As a result, the first base plate 11 has a shape concave toward the first rib 15, and thus so-called warpage, which is an overall not flat and distorted shape, is formed.

Figure 10:
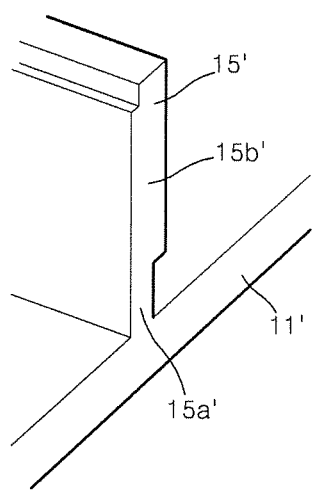

FIG. 10 shows a shape of a first rib 15' according to a second comparative embodiment. The first rib 15' protrudes from a first base plate 11'. The bottom portion 15a' contacting the first base plate 11' is formed to have a relatively small thickness, whereas the upper portion 15b' is formed to have a relatively large thickness. Although the shape takes into consideration a warpage of the first base plate 11' due to contraction-deformation and interference of the first rib 15', if the first rib 15' is formed to have the thick upper portion 15b' and the thin bottom portion 15a' throughout the length of the first rib 15', it is difficult to design a mold therefor and the structural strength of the first rib 15' is deteriorated.

Figure 11A:
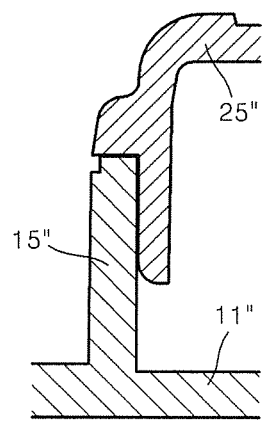
Figure 11B:
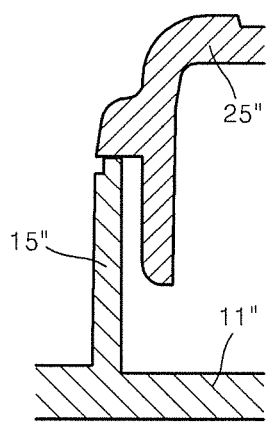

FIGS. 11A and 11B show shapes of a first rib 15" according to a third comparative embodiment. FIGS. 11A and 11B show shapes of the first rib 15" before and after contraction-deformation, respectively.

The first rib 15" protrudes from a first base plate 11", where the first rib 15" is formed to have a small thickness overall. Although the shape is in consideration of contraction-deformation of the first rib 15" and mass-production operations including designing of a mold for the first rib 15", the shape causes loose assembly of a battery pack, thereby causing assembly noises and deteriorating assembly strength.

In detail, the first rib 15" contacts a second rib 25" during assembly of a battery pack and provides a supporting structure that supports the second rib 25". As the first rib 15" is contracted to have a thickness smaller than that of the second rib 25" after contraction-deformation, an area by which the first rib 15" and the second rib 25" contact each other decreases, thereby causing loose attachment. For example, the first rib 15" may not form a precise alignment with the second rib 25" and be contacted to have a thickness smaller than that of the second rib 25". As a result, assembly position of the first rib 15" may not be precisely defined and assembly noises may occur.

In the embodiment of the present invention shown in FIG. 8, instead of forming the first rib 115 to have a large thickness or a small thickness overall, the uneven portion 115a, in which the thick portions 1151 and the thin portions 1152 are alternately and repeatedly arranged in the lengthwise direction of the first rib 115, is formed. Therefore, the problems posed in the first through third comparative embodiments may be completely resolved. Furthermore, cooling contraction of the first rib 115 may be reduced without causing any problems in mass-production, e.g., designing of a mold, and assembly noise during attachment to the second rib 125.

Referring to FIG. 8, the flat portions 115b may be formed at locations nearby the uneven portions 115a, that is, between the uneven portions 115a. The flat portion 115b may have a third thickness t3 that is substantially uniform in the lengthwise direction of the first rib 115.

For example, the third thickness t3 of the flat portion 115b may be identical to the thickness of the thick portion 1151 of the uneven portion 115a (the first thickness t1). The flat portion 115b may have the relatively large third thickness t3 to increase an area by which the first rib 115 contacts the second rib 125 and may stably support the contacting portion of the second rib 125. However, the present invention is not limited thereto. For example, the third thickness t3 of the flat portion 115b may be any of thicknesses between the first thickness t1 of the thick portion 1151 and the second thickness t2 of the thin portion 1152.

Hereinafter, referring to FIG. 1, the overall structure of the battery pack 100 according to an embodiment of the present invention will be described.

The first case 110 and the second case 120 are assembled to face each other with the one or more battery cells 150 therebetween and to define the accommodation space G for accommodating the battery cells 150. For example, the first case 110 may include the first base plate 111, which is arranged to face a first main surface 150a of the battery cell 150, and the first rib 115, which protrudes from the first base plate 111 and surrounds the battery cell 150. Similarly, the second case 120 may include the second base plate 121, which is arranged to face a second main surface 150b of the battery cell 150, and the second rib 125, which protrudes from the second base plate 121 and surrounds the battery cell 150.

If it is assumed that the battery cell 150 is formed to have a substantially hexahedral shape, the first main surface 150a and the second main surface 150b are surfaces having the largest area and may be arranged at opposite sides.

The accommodation space G defined by the first case 110 and the second case 120 may include a cell accommodating space G1 for accommodating the battery cell 150 and the circuit accommodating space G2 for accommodating a circuit unit for controlling operations for charging and discharging the battery cell 150.

For example, the cell accommodating space G1 may occupy most of the accommodation space G and may accommodate a suitable number of battery cells 150 to satisfy demanded output performance of the overall battery pack 100. For example, according to an embodiment of the present invention, the six battery cells 150 may be accommodated in the cell accommodating space G1.

The battery cells 150 may be arranged in parallel to each other to form a same level side-by-side or the plurality of battery cells 150 may be stacked to form upper/lower levels. The parallel arrangement and the stack arrangement may be combined.

For example, according to an embodiment of the present invention, the four battery cells 150 arranged side-by-side may form a first layer, and the two battery cells 150 arranged thereon may form a second layer. In detail, the four battery cells 150 may be arranged on the first case 110 side-by-side, and the two battery cells 150 may be stacked on the two battery cells 150 at two opposite ends.

When the battery cells 150 adjacent to each other are stacked to form different layers, the second main surfaces 150b of the battery cells 150 adjacent to each other may form a stepped portion 150c. Furthermore, the second case 120 arranged on the second main surface 150b may have a stepped portion 120a aligned to the profile of the second main surface 150b. In detail, the second case 120 may have the stepped portion 120a at which the two opposite ends of the second case 120 in the long-side direction (x-axis direction) are offset upward. The stepped portion 120a of the second case 120 is formed to closely contact the battery cells 150 selectively stacked to form the second layer and to firmly fix locations of the battery cells 150 and to make the overall battery pack 100 compact without wasting any space.

The battery cell 150 is a rechargeable secondary battery and may be a lithium-ion battery, for example. The battery cell 150 may include an electrode assembly and an outer casing member 151 for accommodating the electrode assembly. Although not shown, the electrode assembly may be formed by stacking together a positive electrode plate, a separator, and a negative electrode plate and winding the stacked structure in a jellyroll-like shape. The outer casing member 151 may be formed of aluminum or an aluminum alloy. However, the present invention is not limited thereto.

A flexible printed circuit board (FPCB) 140 which electrically interconnects the battery cell 150 and the protection circuit module 130 may be arranged outside the battery cell 150. The FPCB 140 may provide a wiring for extracting power generated by the battery cell 150 or inputting charging voltage from an external charger to the battery cell 150. The FPCB 140 forms an electrical connection with the electrode assembly of the battery cell 150 and may extract power from the electrode assembly to outside.

The FPCB 140 electrically interconnects the battery cells 150 arranged adjacent to each other. For example, the FPCB 140 may interconnect the battery cells 150 arranged adjacent to each other by opposite polarities to connect the battery cells 150 in series or may interconnect the battery cells 150 arranged adjacent to each other by a same polarity to connect the battery cells 150 in parallel. The serial connection and the parallel connection may be combined. For example, the battery cells 150 stacked in the vertical direction may be connected in parallel and the battery cells 150 arranged side-by-side may be connected in series at the same time.

The FPCB 140 may include wirings for electrically interconnect the plurality of battery cells 150 and forming charging and discharging paths and an insulation film for insulation from outside environment.

The circuit accommodating space G2 is formed in the accommodation space G. The circuit accommodating space G2 accommodates the protection circuit module 130 for controlling operations for charging and discharging the battery cells 150. For example, the protection circuit module 130 for controlling operations for charging and discharging the battery cells 150 may measure condition variables, such as currents and temperatures, regarding the battery cells 150 to monitor condition of each of the battery cell 150 and control operations for charging and discharging the battery cells 150 based on the same. Furthermore, the protection circuit module 130 may detect malfunctions, such as overcharging, overdischarging, and overcurrent, in advance and perform safety operations for preventing overheating and explosion.

The protection circuit module 130 may be arranged on charging and discharging paths for charging and discharging the battery cells 150 and control opening and closing of charging and discharging paths. Accordingly, the protection circuit module 130 may include a switching device or the like. A connector for supplying power to a main device may be arranged at an end of the protection circuit module 130.

The circuit accommodating space G2 is for accommodating the protection circuit module 130 electrically connected to the battery cell 150, where the circuit accommodating space G2 may be arranged at an end of the accommodating space G toward which a terminal of the battery cell 150 faces, for connection with the battery cell 150. Here, the first flange unit 1141 and the second flange unit 1142 may be arranged at two opposite sides of the circuit accommodating space G2. By efficiently arranging the first flange unit 1141, the second flange unit 1142, and the circuit accommodating space G2, the battery pack 100 may be compact without wasting any space.

It should be understood that the exemplary embodiments described therein should be considered in a descriptive sense only and not for purposes of limitation. Descriptions of features or aspects within each embodiment should typically be considered as available for other similar features or aspects in other embodiments.

EXPLANATION OF REFERENCE NUMERALS

100: battery pack 110: first case
111: first base plate 114: flange unit
1141: first flange unit 1142: second flange unit
114a: assembly unit 114b: strength reinforcement unit
115: first rib 115a: uneven portion
1151: thick portion 1152: thin portion
115b: flat portion 117: clamping member
118: first connecting unit (connecting plate)
118': connecting opening
120: second case 120a: stepped portion of second case
121: second base plate 125: second rib
128: second connecting unit (hook) 130: protection circuit module
140: flexible printed circuit board 150: battery cell
150a: first main surface 150b: second main surface
G: accommodation space G1: cell accommodating space
G2: circuit accommodating space C: assembly axis

What is claimed is:

1. A battery pack comprising:
    a battery cell;
    a case comprising a first case and a second case coupled together and accommodating the battery cell, wherein the first case comprises:
        a first base plate;
        a first rib extending circumferentially around the first base plate and protruding in a height direction away from the first base plate to generally define battery cell accommodation space for the battery cell around an interior of the first rib, the first rib having a ridged section comprising alternating thick portions and thin portions with respect to a thickness direction that is perpendicular to the height direction of the first rib to prevent contraction and deformation of the first rib; and
    a protection circuit module, wherein the first rib further defines a protection circuit module accommodation space.

2. The battery pack of claim 1, further comprising a flange unit on an exterior of the first rib, wherein the ridged section is located on the first rib adjacent to the flange unit.

3. The battery pack of claim 2, wherein the flange unit comprises a boss configured to receive an external device.

4. The battery pack of claim 2, wherein when the first case and the second case are coupled together, the flanged portion is exposed.

5. The battery pack of claim 1, wherein the ridged section extends along an entirety of the first rib.

6. The battery pack of claim 1, wherein the ridged section is on a corner of the first rib.

7. The battery pack of claim 1, wherein the first case comprises a first base plate, and wherein the first rib extends away from the first base plate.

8. The battery pack of claim 2, wherein the flange unit is on a corner of the first case.

9. The battery pack of claim 2, wherein the flange unit comprises a first flange unit and a second flange unit spaced from each other.

10. The battery pack of claim 9, wherein the protection circuit module is between the first flange unit and the second flange unit.

11. The battery pack of claim 1, wherein the ridged section comprises a first ridged section and a second ridged section and wherein the first rib has a flat section between the first ridged section and the second ridged section.

12. The battery pack of claim 11, wherein the flat section has an opening configured to receive a fastener to couple the first case to the second case.

13. The battery pack of claim 12, further comprising a connecting unit offset from the first rib and wherein the opening is on the connecting unit.

14. The battery pack of claim 11, wherein a thickness of the flat section and a thickness of the thick portions are substantially identical.

15. The battery pack of claim 1, wherein the ridged section comprises a plurality of ridged sections spaced from each other.

16. The battery pack of claim 1, wherein a thickness of the thick portions and thin portions is equal to or less than a thickness of the first base plate.

17. The battery pack of claim 1, wherein the battery pack comprises a plurality of battery cells that are stacked to form a stepped configuration.

18. The battery pack of claim 17, wherein second case comprises a second base plate having a stepped configuration to accommodate the stepped configuration of the battery cells.

19. The battery pack of claim 1, wherein the thick portions protrude toward the battery cell relative to the thin portions.

* * * * *